(12) United States Patent
Larsen et al.

(10) Patent No.: US 10,581,968 B2
(45) Date of Patent: Mar. 3, 2020

(54) MULTI-NODE STORAGE OPERATION

(71) Applicant: Intel Corporation, Santa Clara, CA (US)

(72) Inventors: Steen Larsen, Portland, OR (US); Francesc Guim Bernat, Barcelona (ES); Kshitij A. Doshi, Tempe, AZ (US); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 15/477,076

(22) Filed: Apr. 1, 2017

(65) Prior Publication Data

US 2018/0288153 A1    Oct. 4, 2018

(51) Int. Cl.
| | |
|---|---|
| *H04L 29/08* | (2006.01) |
| *G06F 13/40* | (2006.01) |
| *G06F 11/30* | (2006.01) |
| *G06F 3/06* | (2006.01) |
| *G06F 9/50* | (2006.01) |

(52) U.S. Cl.
CPC .......... *H04L 67/1097* (2013.01); *G06F 3/067* (2013.01); *G06F 3/0607* (2013.01); *G06F 3/0683* (2013.01); *G06F 11/3006* (2013.01); *G06F 13/40* (2013.01); *H04L 29/08549* (2013.01)

(58) Field of Classification Search
CPC .......... H04L 67/1097; H04L 29/08549; G06F 13/40; G06F 11/3006; G06F 3/0683; G06F 3/0607; G06F 3/067
See application file for complete search history.

(56) References Cited

U.S. PATENT DOCUMENTS

| | | |
|---|---|---|
| 6,345,245 B1 | 2/2002 | Sugiyama et al. |
| 7,415,591 B1 | 8/2008 | Todd et al. |
| 2004/0030703 A1 | 2/2004 | Bourbonnais et al. |
| 2016/0364158 A1* | 12/2016 | Narayanan ............ G06F 3/0619 |
| 2016/0371356 A1* | 12/2016 | Lee ..................... G06F 16/2379 |
| 2018/0159717 A1* | 6/2018 | Cormie ................. G06F 3/0607 |
| 2018/0218778 A1* | 8/2018 | Chakraborty ...... G11C 29/1201 |
| 2018/0232412 A1* | 8/2018 | Bensberg .......... G06F 17/30377 |

OTHER PUBLICATIONS

Extended European Search Report dated Aug. 14, 2018, in EP Application No. 18155646.5, filed Feb. 7, 2018; 3 pages.

* cited by examiner

*Primary Examiner* — Arvin Eskandarnia
*Assistant Examiner* — Chhian (Amy) Ling
(74) *Attorney, Agent, or Firm* — Thorpe North & Western, LLP

(57) ABSTRACT

A technology is described for performing a multi-node storage operation. An example networked memory storage group coupled to a plurality of computing nodes through s network fabric can be configured to receive a transaction detail message from a master computing node that includes a transaction identifier and transaction details for a multi-node storage operation. Thereafter, storage operation requests that include the transaction identifier may be received from computing nodes assigned storage operation tasks associated with the multi-node storage operation. The networked memory storage group may be configured to determine that storage operations for the multi-node storage operation have been completed and send a message to the master computing node indicating a completion state of the multi-node storage operation.

14 Claims, 7 Drawing Sheets

MULTI-NODE STORAGE OPERATION

BACKGROUND

Data centers are facilities that house a plurality of computing nodes. For example, a typical data center can include hundreds or thousands of computing nodes. The computing nodes can include processing capabilities to perform computing and memory for data storage. Data centers can include network switches and/or routers to enable communication between different computing nodes in the data center. Data centers can employ redundant or backup power supplies, redundant data communications connections, environmental controls (e.g., air conditioning, fire suppression, etc.) and various security devices.

A data storage operation for data storage can be divided into multiple operations. The operations can be assigned to a plurality of computing nodes. Each computing node can perform the operation assigned to the computing node, and the computing node can provide a state of the operation to a coordinator node.

Figure 1:
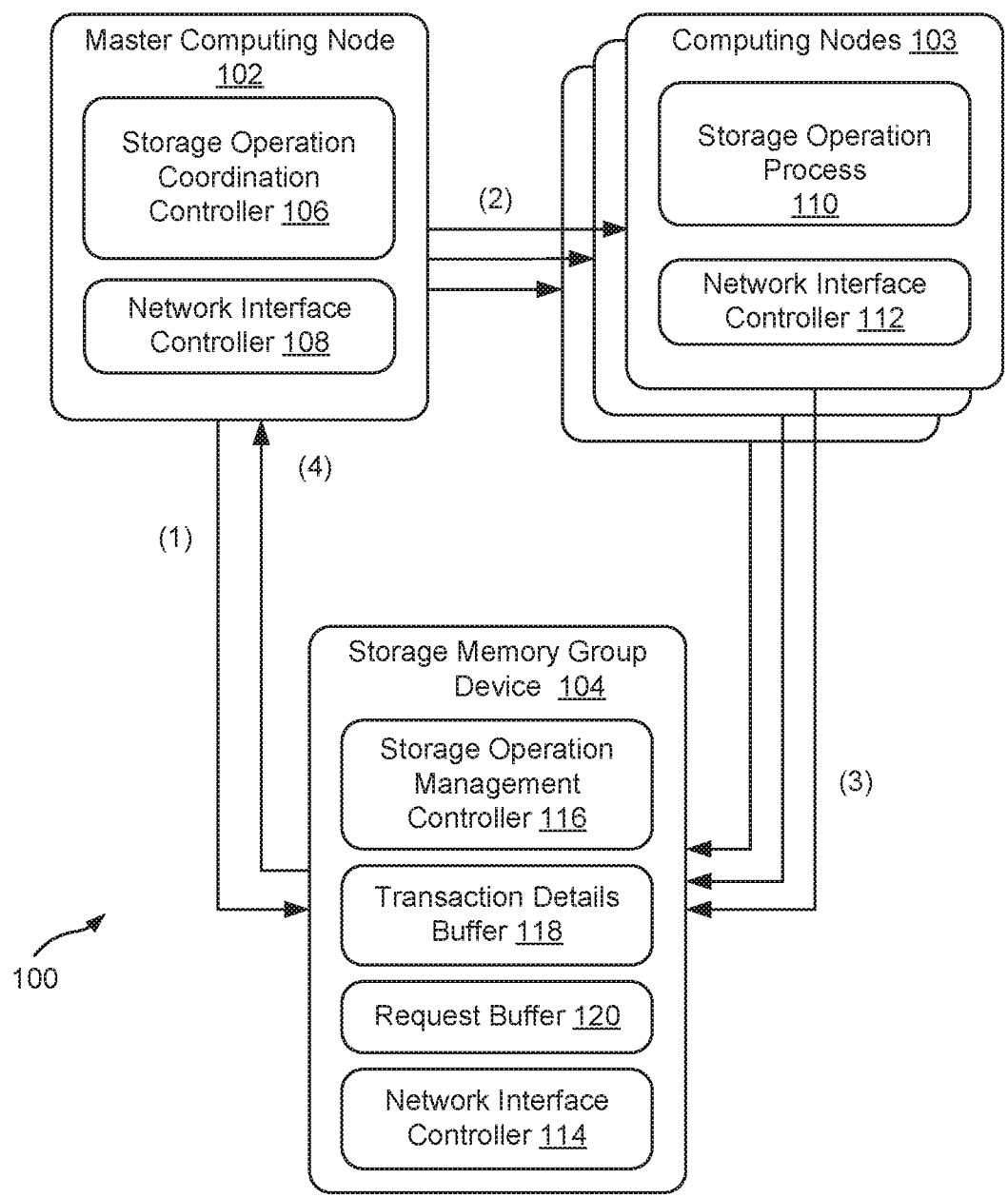
FIG. 1 is a block diagram illustrating an example system that can be used to perform a multi-node storage operation in accordance with an example embodiment.

Reference will now be made to the exemplary embodiments illustrated, and specific language will be used herein to describe the same. It will nevertheless be understood that no limitation on invention scope is thereby intended.

DESCRIPTION OF EMBODIMENTS

Although the following detailed description contains many specifics for the purpose of illustration, a person of ordinary skill in the art will appreciate that many variations and alterations to the following details can be made and are considered included herein.

Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing," and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of language" as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

A technology is described for performing a multi-node storage operation. The technology may include coordinating a multi-node storage operation with a memory storage device, system, or subsystem (collectively a "memory storage device"), such as, for example, a networked memory storage group device or other type of shared memory storage device, by providing the memory storage device with transaction details for the multi-node storage operation. The memory storage device may be configured to use the transaction details to determine a final state of the multi-node storage transaction, and to indicate the final state to a master or coordinator computing node.

A memory storage device can be included in data center that comprises a large number of compute, memory, and storage resources connected using high speed interconnects that, when combined, create a distributed and tightly coupled compute-memory-storage ensemble. A memory storage device can be configured to provide byte-addressable memory, block-addressable memory, or both, in a compute-memory-storage ensemble.

In one example, a master computing node provides transaction details for a multi-node storage operation to a memory storage device, and assigns storage operation tasks included in the multi-node storage operation to a plurality of computing nodes. Such computing nodes can vary, and the type of computing node, hardware, architecture, and the like, is not limiting. Examples can include servers, computing platforms, high performance computing systems and devices, storage nodes, including racks of storage devices, housings including multiple storage devices, single large-capacity storage devices, and the like, central processing unit (CPU)-based nodes, graphic processing unit (GPU)-based nodes, hybrid CPU/GPU-based nodes, and the like. Transaction details may include metadata describing a multi-node storage operation. In one example, transaction details can include a total number of expected tasks or transactions, a list of IDs for the tasks or transactions that should reach the memory storage, and the like. Thereafter, the computing nodes send storage operation requests to the memory storage device related to the multi-node storage operation. The memory storage device correlates the storage operation requests to the transaction details provided by the master computing node, enabling the memory storage device to determine a state of the multi-node storage operation, and to provide the state of the multi-node storage operation to the master computing node.

A common approach to improving performance in a distributed system can include dividing work into individual operations that can be staged on multiple computing nodes included in the distributed system. These operations typically need to provide durability and consistency guarantees so that a final state following a sequence of operations can be preserved. Preserving the final state of a multi-node operation, even when individual computing nodes become inoperative, can be typically achieved using a master that coordinates performance of the multi-node operation to completion by determining the state of individual operations. In the past, a common type of coordination included a two-phase commit protocol in which computing nodes participating in a multi-node operation report their completions to a master, and the master then closes or commits the multi-node operation.

As a result of the present technology, however, a memory storage device can be configured to determine the state of a multi-node storage operation using transaction details for the multi-node storage operation provided by a master. The memory storage device can provide the state of the multi-node storage operation to the master, thereby eliminating a need for synchronous messaging between the master and the participating computing nodes.

To further describe the present technology, FIG. 1 is a block diagram illustrating an example system 100 that can be used to perform a multi-node storage operation. The system 100 can include a memory storage group device 104 providing storage and memory pooling capabilities, a master computing node 102, and a plurality of computing nodes 103. The master computing node 102, the computing nodes 103, and memory storage group device 104 can include network interface controllers 108/112/114 that enable network communication between the master computing node 102, the computing nodes 103, and memory storage group device 104.

The master computing node 102 can include a storage operation coordination controller 106 configured to coordinate a multi-node storage operation. A multi-node storage operation may comprise a storage operation (e.g., read, write, delete, etc.) that is divided into a number of storage operation tasks. The storage operation tasks can be distributed to a plurality of computing nodes 103, such that a computing node 103 may be responsible for performing an assigned storage operation task. As an illustration, a multi-node storage operation that updates a shared object stored to a memory storage group device 104 can be divided into storage operation tasks directed to different portions of the shared object. The storage operation tasks can be assigned to a plurality of computing nodes 103, such that each computing node 103 is responsible for an assigned portion of the shared object.

In one example, the storage operation coordination controller 106 can be configured to generate a transaction detail message and provide the transaction detail message to the memory storage group device 104. The transaction detail message can include a transaction identifier and transaction details for a multi-node storage operation. The transaction identifier may be a unique identifier used to associate storage operation communications with the multi-node storage operation. The transaction details may indicate the scope of the multi-node storage operation. As a non-limiting example, the transaction details may specify a number of storage operations (e.g., write operations) that are included in the multi-node storage operation, and/or the transaction information may identify the computing nodes 103 assigned storage operation tasks included in the multi-node storage operation. The transaction identifier and the transaction details can be used to track the state of a multi-node storage operation at the memory storage group device 104.

In combination with generating the transaction detail message for the multi-node storage operation, the storage operation coordination controller 106 can be configured to generate storage transaction messages for the multi-node storage operation that are provided to computing nodes 103. The storage transaction messages may include the transaction identifier for the multi-node storage operation and instructions for performing one or more storage operation tasks of the multi-node storage operation. The master computing node 102 determines the computing nodes 103 that are to perform the storage operation tasks, and the master computing node 102 provides the storage transaction messages to the computing nodes 103.

A computing node 103 may host a storage operation process 110 configured to perform storage operation tasks of multi-node storage operations. A computing node 103 may receive storage transaction messages from a master computing node 102 that include a transaction identifier for a multi-node storage transaction and instructions to perform one or more storage operation tasks of the multi-node storage transaction. In response to receiving a storage transaction message, a storage operation process 110 hosted on the computing node 103 may perform a storage operation task specified in the storage transaction message. As part of performing a storage operation task, the storage operation process 110 may send one or more storage operation requests to the memory storage group device 104. A storage operation request may include a transaction identifier for a multi-node storage operation and a request that the memory storage group device 104 perform a storage operation (e.g., create, write, update, etc.).

In some cases, the master computing node 102 may also participate in a multi-node storage operation, and as such, the master computing node 102 may host its own storage operation process configured to perform a storage operation task included in a multi-node storage operation. Accordingly, as part of performing a storage operation task, the master computing node 102 may send a storage operation request to the memory storage group device 104.

The memory storage group device 104 can include a storage operation management controller 116 configured to monitor the state of a multi-node storage operation via a transaction identifier and transaction details for the multi-node storage operation, and provide the state of the multi-node storage operation to the master computing node 102. As described above, the memory storage group device 104 may receive a transaction identifier and transaction details for a multi-node storage operation from the master computing node 102. As described above, the transaction details may indicate the scope of a multi-node storage operation.

In one example, transaction details for a multi-node storage operation can be stored to a transaction details buffer 118. Transaction details stored in the transaction details buffer 118 may be linked to a transaction identifier for a multi-nodes storage operation. Storage operation requests received from computing nodes 103 may include a transaction identifier that can be mapped to transaction details stored in the transaction details buffer 118.

The storage operation management controller 116 can be configured to correlate a storage operation specified in a storage operation request with transaction details of a multi-node storage operation. In doing so, a state of the multi-node storage operation can be determined by correlating storage operations requested by computing nodes 103 to the transaction details of the multi-node storage operation.

As one example of correlating storage operations to transaction details, the transaction details for a multi-node storage operation may specify a number of transaction operations that comprise the multi-node storage operation. The storage operation management controller 116 can be configured to monitor transaction operations associated with the multi-node storage operation via a transaction identifier and determine that the multi-node storage operation is complete when the number of transaction operations have been performed.

As another example of correlating storage operations to transaction details, the transaction details for a multi-node storage operation may specify storage operation identifiers assigned to each storage operation that comprises a multi-node storage operation. The storage operation identifiers can be used to track storage operations. For example, a storage operation request received from a computing node 103 can include both a transaction identifier for the multi-node storage operation and a storage operation identifier. The transaction identifier can be used to associate the storage operation with the multi-node storage operation, and the storage operation identifier can be used to correlate the storage operation with a storage operation specified in the transaction details for the multi-node storage operation. The storage operation management controller 116 can be configured to determine that the multi-node storage operation is complete when storage operations associated with the storage operation identifiers have been performed.

As yet another example of correlating storage operations to transaction details, the transaction details for a multi-node storage operation may specify computing node identifiers for computing nodes 103 that have been assigned storage operation tasks. The storage operation management controller 116 can be configured to correlate storage operation requests received from the computing nodes 103 with the computing node identifiers specified in the transaction details and determine that the multi-node storage operation is complete when storage operations associated with requests from the computing nodes 103 have been performed.

In one example, the storage operation management controller 116 can be configured to perform analysis on transaction details for a multi-node storage operation to determine an execution plan for the multi-node storage operation. For example, because transaction details for a multi-node storage transaction are provided to the memory storage group device 104 (e.g., prior to receiving storage operation requests associated with the multi-node storage operation), the transaction details for the multi-node storage operation can be analyzed to determine an execution plan that may result in improving execution of the multi-node storage operation. Illustratively, an execution plan may include buffering storage operation requests and combining and/or reordering execution of the storage operation requests.

In the case that transaction details for a multi-node storage operation have been analyzed and an execution plan has been formed, storage operation requests received from the computing nodes 103 (and in some cases, storage operation requests received from the master computing node 102) can be buffered to a request buffer 120. The storage operation management controller 116 can be configured to monitor the incoming storage operation requests and execute the requested storage operations according to the execution plan. For example, storage operations can be combined into a single storage operation specified by the execution plan and/or storage operations can be executed in an order specified by the execution plan.

The storage operation management controller 116, in one example, can be configured to implement write-ahead logging, where completion of a multi-node storage operation can be reported to the master computing node 102 prior to actual completion of the multi-node storage transaction. In doing so, the storage operation management controller 116 can be configured to covert random storage operations (e.g., random write operations) associated with computing node requests into sequential storage operations (e.g., sequential write operations), followed by lazy storage operations (e.g., lazy write operations) as part of updating portions of a data object stored to the memory storage group device 104.

Because each participant (e.g., master computing node 102 and computing nodes 103) involved in a multi-node storage operation can communicate with the memory storage group device 104 without blocking another participant, those participants having multiple storage operation requests to send to the memory storage group device 104 as part of a multi-node storage transaction can do so asynchronously. As a result, a participant can perform streaming storage operation requests, which may result in local benefits to the participant, such as pooling multiple requests into fewer messages, even when the requests may be unrelated to one another, thereby providing benefits that may include overlapping local computations for storage operation tasks with streaming storage operation requests for those storage operation tasks.

The storage operation management controller 116 may be configured to provide the state of the multi-node storage operation to the master computing node 102. In one example, the storage operation management controller 116 can be configured to provide the master computing node 102 with a state indicator or state indication that a multi-node storage operation completed successfully, or failed. In the case that a multi-node storage operation failed, in some examples the storage operation management controller 116 can be configured to provide details associated with the failure. In another example, the storage operation management controller 116 can be configured to periodically provide the master computing node 102 with status reports on the progress of a multi-node storage operation. For example, a completion percentage or a listing of completed storage operations can be provided to the master computing node 102. Illustratively, a status report can be provided to the master computing node 102 after a predetermined number of storage operation requests have been received or after a number of storage operations have been performed.

As an operation example of the system 100, the master computing node 102 generates a transaction detail message that includes a transaction identifier and transaction details for a multi-node storage operation, and the master computing node 102 sends the transaction detail message to the memory storage group device 104. The master computing node 102 also generates storage transaction messages that include the transaction identifier and instructions for each computing node 103 that is to perform a storage operation task associated with the multi-node storage operation, and the master computing node 102 sends the storage transaction messages to the computing nodes 103 assigned to perform the multi-node storage operation. The computing nodes 103, as part of performing the storage operation tasks, send storage operation requests that include the transaction identifier for the multi-node storage operation to the memory storage group device 104. In response, the memory storage group device 104 performs the individual storage operations, and correlates the storage operations to the multi-node storage operation via the transaction details received from the master computing node 102. Having performed the storage operations that comprise the multi-node storage operation, the memory storage group device 104 sends a completion state message to the master computing device 102, indicating that the multi-node storage operation has been performed.

Figure 2:
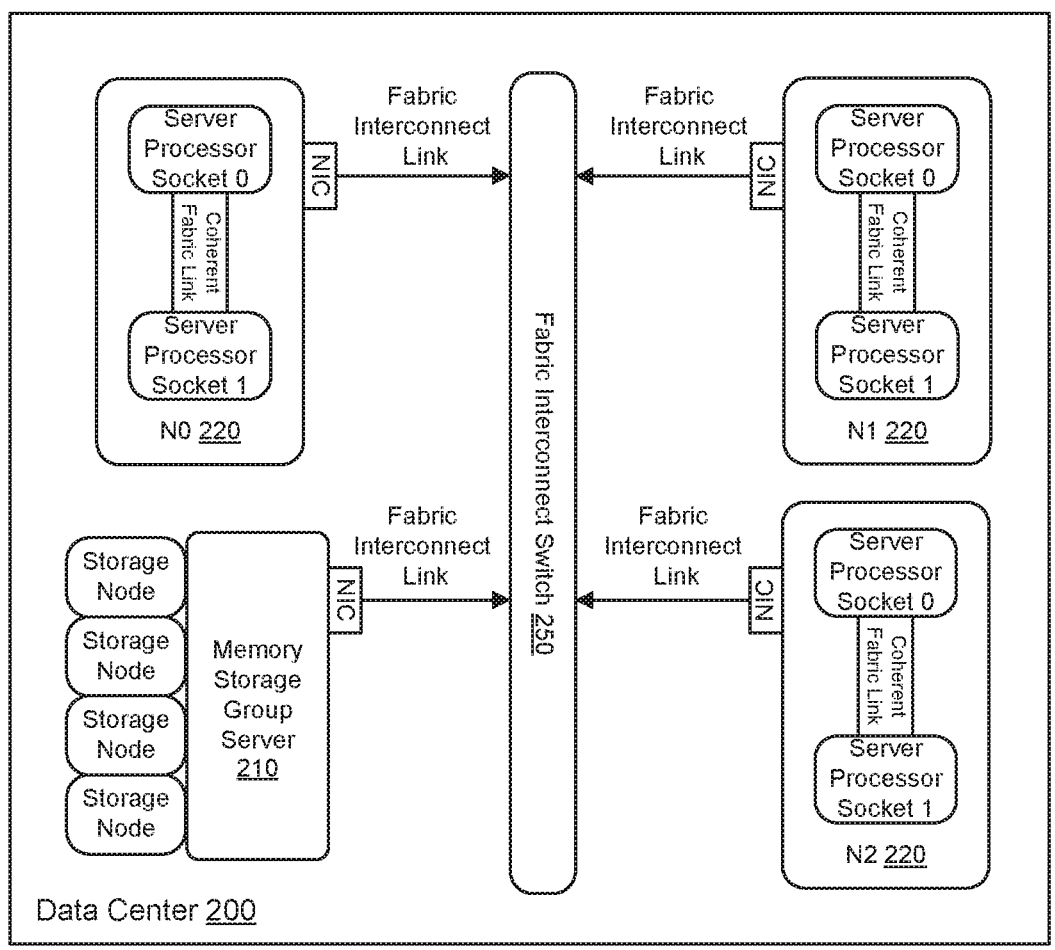
FIG. 2 is a block diagram illustrating example components of a data center in accordance with an example embodiment.

FIG. 2 is a block diagram illustrating example components of a data center 200 on which the present technology can be implemented. The data center 200 can include a memory storage group server 210 and a plurality of computing nodes 220. The memory storage group server 210 provides access to a networked memory storage group comprising a distributed storage system that utilizes computing resources to manage the storage operations of hundreds, thousands, or more memory storage devices. The networked memory storage group may provide storage and memory pooling capabilities. The memory storage group server 210 may be accessible to a plurality of computing nodes through high speed interconnects (e.g., an intelligent high speed fabric, network fabric, or the like), making the networked memory storage group appear to the computing nodes 220 as locally connected memory storage. The high speed interconnects or network fabrics, for example, may be operated according to Intel® Corporation's Storm Lake (STL) Fabric Technology using the Intel Omni-Path architecture (Intel OPA) or operated according to one or more Ethernet specifications.

The memory storage group server 210 may include a target side interface configured to perform the functions of the storage operation coordination controller described in association with FIG. 1. The functions of the storage operation coordination controller 106 can be layered into the fabric interface logic of the storage group sever 210, either as hardware, firmware, or as embedded software.

The data center 200 can employ a scale-out system in which additional nodes can be added or removed. In one example, a computing node 220 can be configured with multiple server processor sockets, allowing a single node to host multiple processes that can be assigned storage operation tasks. The memory storage group server 210 and the computing nodes 220 can each include a network interface controller (NIC). The NICs can enable the computing nodes 220 to communicate with the memory storage group server 210 and with each other over a communication interface, such as, for example, a fabric interconnect switch 250. As one example, the NIC in a first computing node 220 (N0) can communicate with the NIC in a second computing node 220 (N1) or with the NIC in a third computing node 220 (N2), as well as with the memory storage group server 210. In one example, the memory storage group server 210 can include a first NIC configured to communicate with the computing nodes 220 and a second NIC configured to send storage operation instructions to the networked storage devices. In addition, each of the computing nodes 220 and the memory storage group server 210 can be connected to the fabric interconnect switch 250 via fabric interconnect links that creates coherent fabric tunnels. The data center 200 can utilize different types of computing nodes that operate together to perform a multi-node storage operation, for example, in a machine learning application, big data application, or the like.

A memory storage group server can include various types of storage nodes, including various types of storage memory. Storage nodes can be large capacity and/or collections of storage devices, such as, for example, magnetic hard drives, solid state drives, hybrid drives, and the like, including combinations thereof. The storage medium can include any type of memory that allows the persistent storage of data. For example, nonvolatile memory (NVM) is a type of persistent storage medium that does not require power to maintain the state of data stored therein. Nonlimiting examples of NVM can include planar or three-dimensional (3D) NAND flash memory, NOR flash memory, cross point array memory, including 3D cross point memory, phase change memory (PCM), such as chalcogenide PCM, non-volatile dual in-line memory module (NVDIMM), ferroelectric memory (FeRAM), silicon-oxide-nitride-oxide-silicon (SONOS) memory, polymer memory (e.g., ferroelectric polymer memory), ferroelectric transistor random access memory (Fe-TRAM), spin transfer torque (STT) memory, nanowire memory, electrically erasable programmable read-only memory (EEPROM), magnetoresistive random-access memory (MRAM), write in place non-volatile MRAM (NVMRAM), nanotube RAM (NRAM), and the like, including combinations thereof. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In one specific example, the NVM is 3D cross point memory. In another example, the NVM is 3D NAND flash memory.

Figure 3:
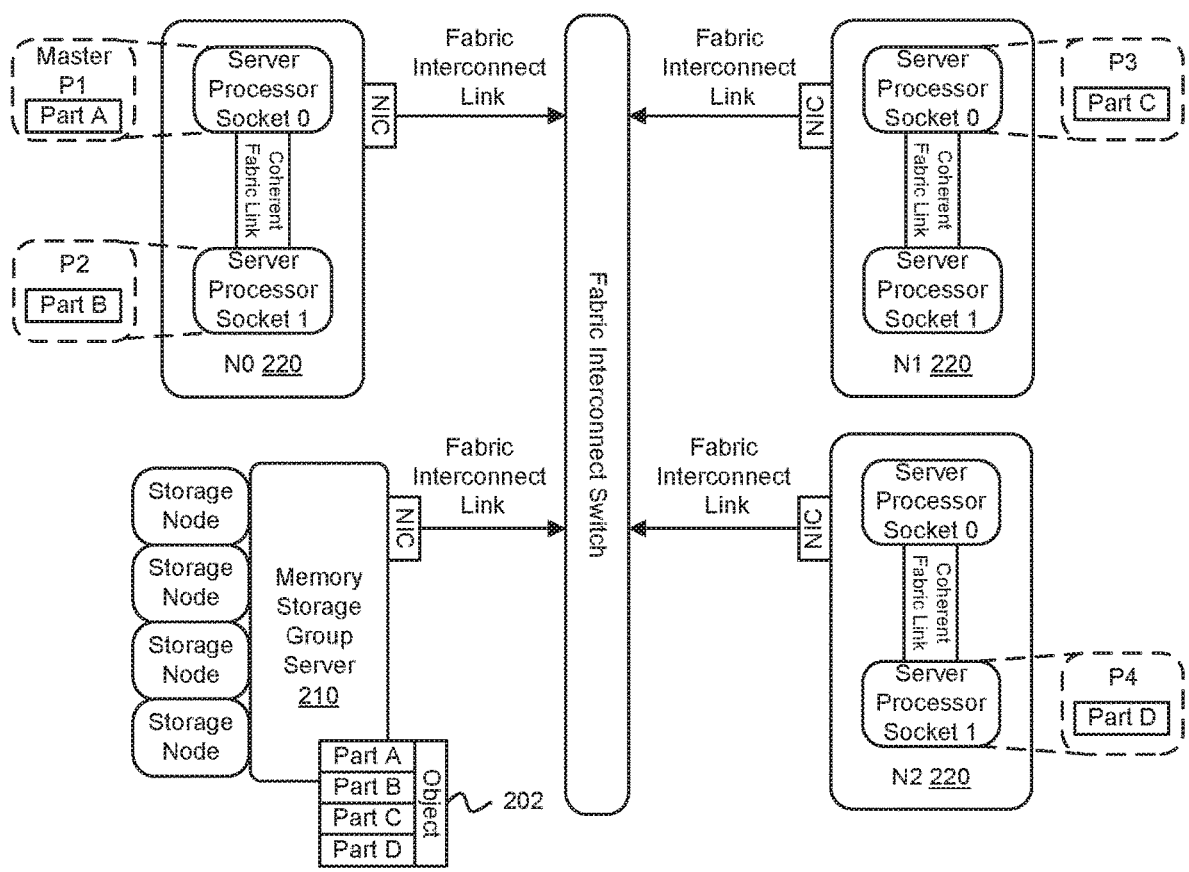
FIG. 3 illustrates a multi-node storage operation performed using the example components of FIG. 2 in accordance with an example embodiment.

FIG. 3 is a block diagram that illustrates the example components of a data center as described above along with an illustration of a multi-node storage operation performed using the example components. Described according to a configuration as illustrated in FIG. 2, a shared object 202 stored to a networked memory storage group implemented via a memory storage group server 210 may be accessible to computing nodes 220 that are in network communication with the memory storage group server 210. The shared object 202 can be modified using a multi-node storage operation where individual storage operations included in the multi-node storage operation may be responsible for different parts (e.g., Parts A, B, C, D) of a global state of the shared object 202.

As described above, the computing nodes 220 can include multiple server processor sockets, each of which can host a process (P1, P2, P3, P4) that executes storage operation tasks. As illustrated, a master process (P1) may act as a coordinator for a multi-node storage operation that updates the state of the shared object 202. The master process (P1) may send a transaction identifier and transaction details for the multi-node storage operation to the memory storage group server 210. The transaction details provide the memory storage group server 210 with a scope of the multi-node storage operation, for example, a number of writes included in the multi-node storage operation, the processes (P2, P3, P4) that have been assigned storage operation tasks, or instructions on how to determine that the multi-node storage operation is complete.

The master process (P1) may contact other processes (P2, P3, P4) that may be responsible for different parts of the global state of the shared object 202. In addition to acting as the coordinator, the master process (P1) may be responsible for a part of the global state of the shared object 202. The master process (P1) may provide the other processes (P2, P3, P4) with the transaction identifier for the multi-node storage operation. In turn, the processes (P2, P3, P4), including the master process (P1), may add the transaction identifier to write requests sent by the processes (P1, P2, P3, P4) to the memory storage group server 210.

The memory storage group server 210, via fabric interface logic included in the memory storage group server 210, obtains the transaction identifier from the write requests received from the processes (P1, P2, P3, P4) and acts as a back-end coordinator to determine, based on the transaction details provided by the master process (P1), the state of the multi-node storage operation. For example, the memory storage group server 210 can determine whether each write to the shared object 202 has been performed. Having determined the state of the multi-node storage operation, the memory storage group server 210 can inform the master process (P1) that the multi-node storage operation is complete.

Figure 4:
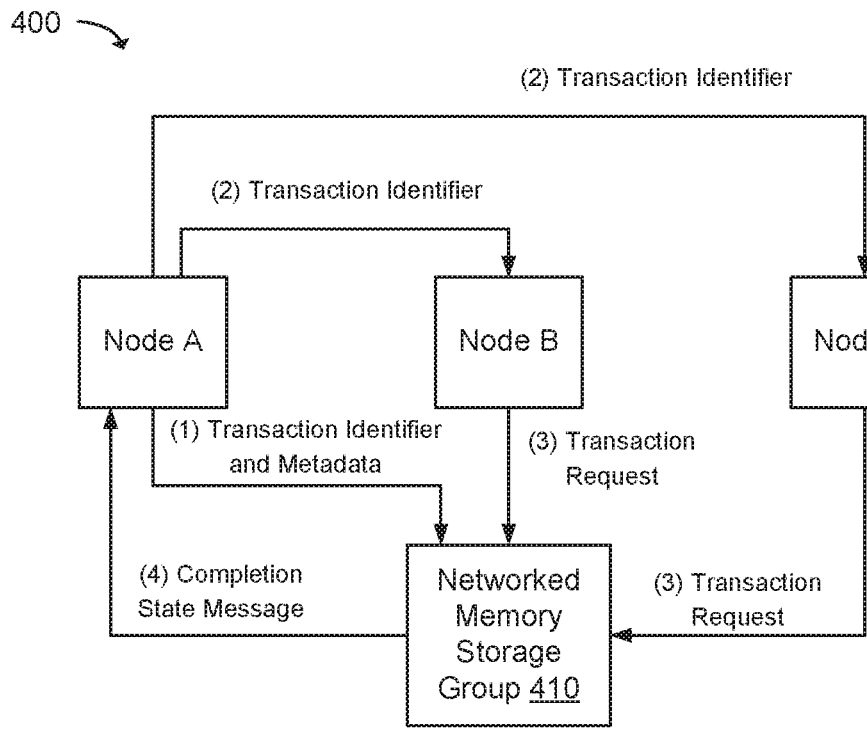
FIG. 4 is a flow diagram illustrating an example method for coordinating a multi-node storage operation in accordance with an example embodiment.

FIG. 4 is a flow diagram illustrating an example method 400 for coordinating a multi-node storage operation. The method 400 may include a plurality of nodes (Nodes A, B, C) tasked with performing a data operation on a data (e.g., a shared object) stored to a networked memory storage group 410, as described herein. In this example, Node A may coordinate the multi-node storage operation by sending a transaction identifier for the multi-node storage operation and metadata describing the multi-node storage operation to the networked memory storage group 410, and sending the transaction identifier to Nodes B and C with instructions to include the transaction identifier with storage operation requests sent to the networked memory storage group 410.

The metadata describing the multi-node storage operation may provide the networked memory storage group 410 with notice of the multi-node storage transaction and details of the multi-node storage transaction. More specifically, logic configured into hardware, firmware, or embedded software of networked memory storage group 410 may be provided with the metadata describing the multi-node storage operation, whereupon requests received at the networked memory storage group 410 can be monitored to determine whether a request is associated with the multi-node storage operation and whether the request can be correlated to the metadata.

Accordingly, after receiving the metadata, the networked memory storage group 410 waits to receive transaction requests from Node B and Node C that include the transaction identifier. In receiving the transaction requests from Node B and Node C, the networked memory storage group 410 can identify the transaction identifier included in the transaction requests as being associated with the multi-node storage operation and can correlate the transaction requests to the metadata describing the multi-node storage operation. The transaction requests can be sent to the networked memory storage group 410 in parallel and the networked memory storage group 410 can buffer the transaction requests and perform the transactions based on a predetermined order or based on analysis of the metadata provided by Node A.

After receiving the transaction requests and performing the multi-node storage operation (or after a determination that the multi-node storage operation failed), the networked memory storage group 410 can determine the state of the multi-node storage operation and send a completion state message to Node A. The method 400 can reduce the number of messages, or the message traffic, between Nodes A, B, C and the networked memory storage group 410 as compared to other multi-node operation methods, as messages can be sent in parallel. Thus, Node A may not have to wait for responses from Nodes B and C, and Nodes B and C may not have to wait for responses from the networked memory storage group 410, thereby reducing the message traffic through the network. The benefit of reduced messages sent between nodes increases with the number of nodes participating in the multi-node storage operation.

Figure 5:
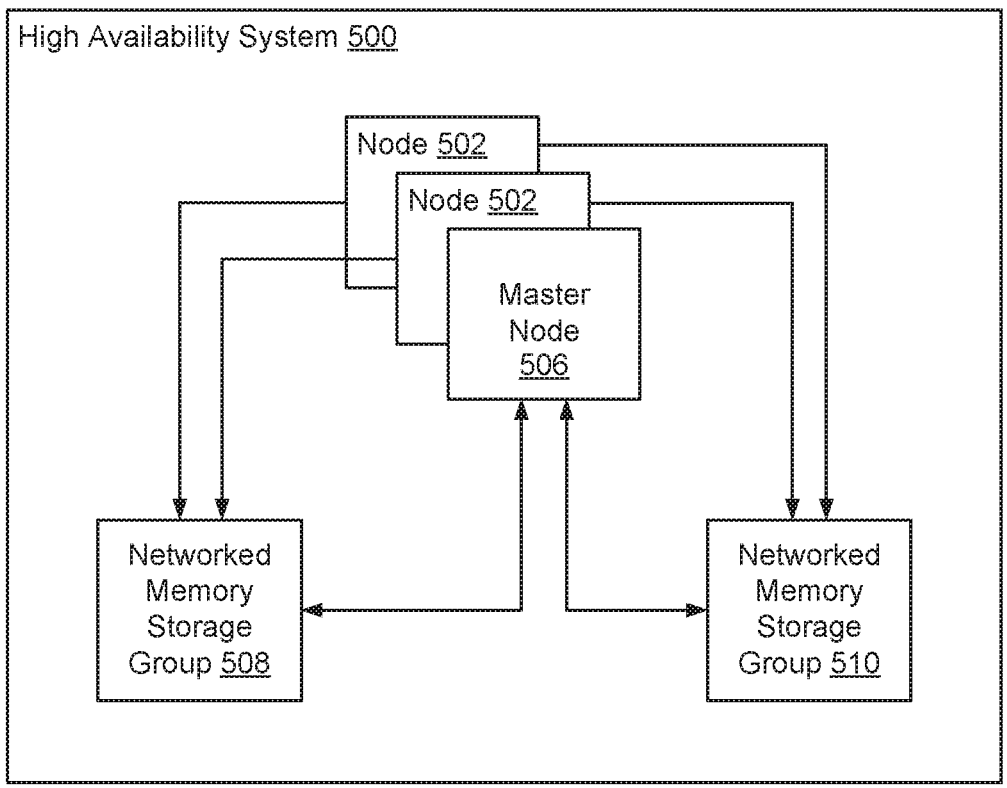
FIG. 5 is a block diagram illustrating an example high availability system in accordance with an example embodiment.

FIG. 5 is a block diagram illustrating an example high availability system 500 in accordance with the technology. The high availability system 500 may include a plurality of replicated networked memory storage groups 508/510. The replicated networked memory storage groups 508/510 may participate in a multi-node storage operation as peers in the overall transaction process, such that each networked memory storage group 508/510 reports a state or state indicator of the multi-node storage operation to a master node 506 independent of one another. The master node 506 considers the multi-node storage operation complete upon receiving completion states from each of the networked memory storage group 508/510.

For example, the master node 506 may send a transaction identifier and transaction details for a multi-node storage operation to a first networked memory storage group 508 and a second networked memory storage group 510. The master node 506 may also provide the transaction identifier to nodes 502 participating in the multi-node storage operation. The nodes 502 may send storage operation requests to both the first networked memory storage group 508 and the second networked memory storage group 510. After performing storage operations in response to the storage operation requests, the first networked memory storage group 508 and the second networked memory storage group 510 may send completion states to the master node 506, whereupon the master node 506 may consider the multi-node storage operation complete.

Figure 6:
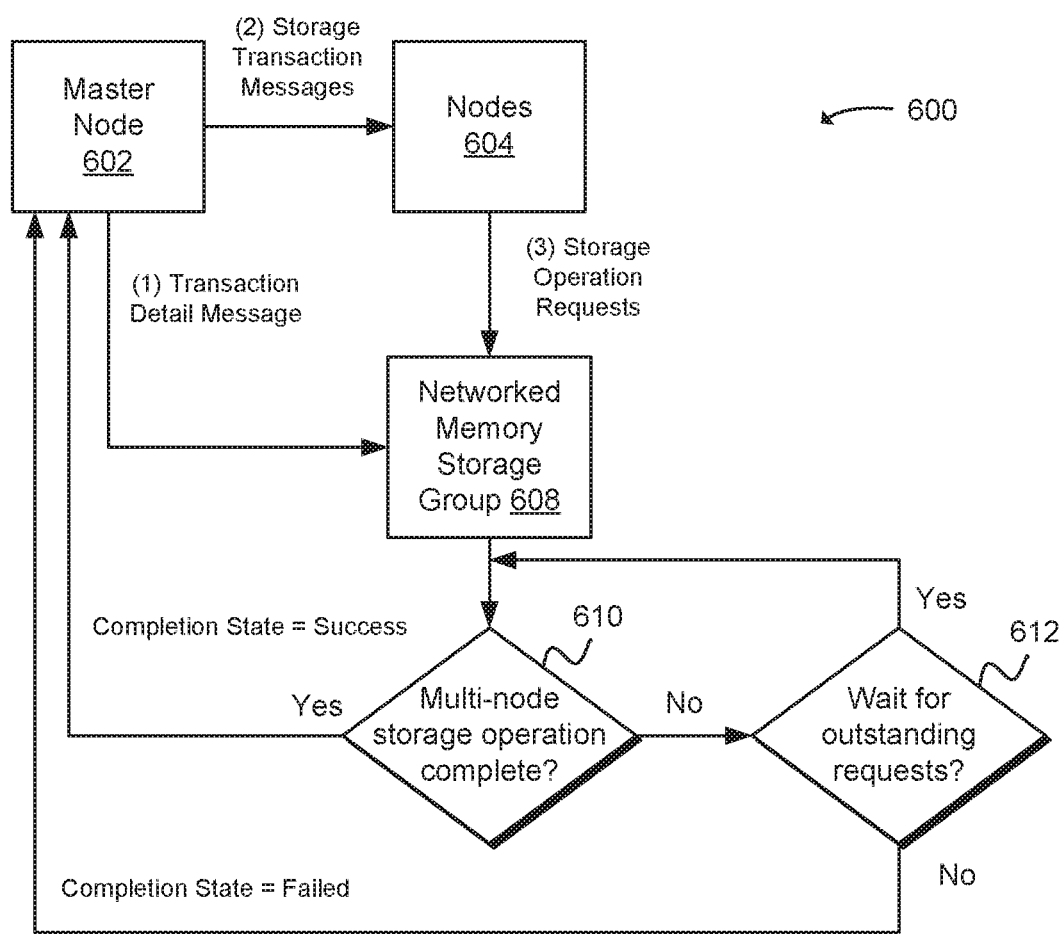
FIG. 6 is a flow diagram that illustrates an example method for determining a completion status of a multi-node storage operation in accordance with an example embodiment.

FIG. 6 is a flow diagram that illustrates an example method 600 for determining a completion status of a multi-node storage operation. As illustrated a master node 602 may coordinate a multi-node storage operation between a plurality of nodes 604 and a networked memory storage group 608. As described earlier, the networked memory storage group 608 receives transaction details that can be used to determine the scope of a multi-node storage operation, enabling a completion state determination to be made.

The method 600 provides one example of determining a completion state for a multi-node storage operation. After performing a storage operation in response to receiving a request from a node 604, as in block 610, a determination can be made whether the multi-node storage operation is complete by determining whether the conditions of the transaction details have been fulfilled (e.g., a specified number of write operations have been performed). In the case that the conditions of the transaction details have been fulfilled, the networked memory storage group 608 may send a completion state to the master node 602 indicating that the multi-node storage operation has competed.

In the case that the conditions of the transaction details have not been fulfilled, then as in block 612, a determination whether to wait for outstanding requests from the nodes 604 may be made. For example, because a node 604 may fail, or a storage operation request message may not be received, a timeout may specify an amount of time in which storage operation requests are received, or a time in which storage operations are performed before a multi-node storage operation is considered to have failed.

In the case that a determination is made to wait for outstanding requests, the networked memory storage group 608 may continue to monitor storage operation requests for requests that include the transaction identifier. In the case that a determination is made to not wait for missing storage operation requests, then a completion state indicating that the multi-node storage operation failed may be sent to the master node 602.

Figure 7:
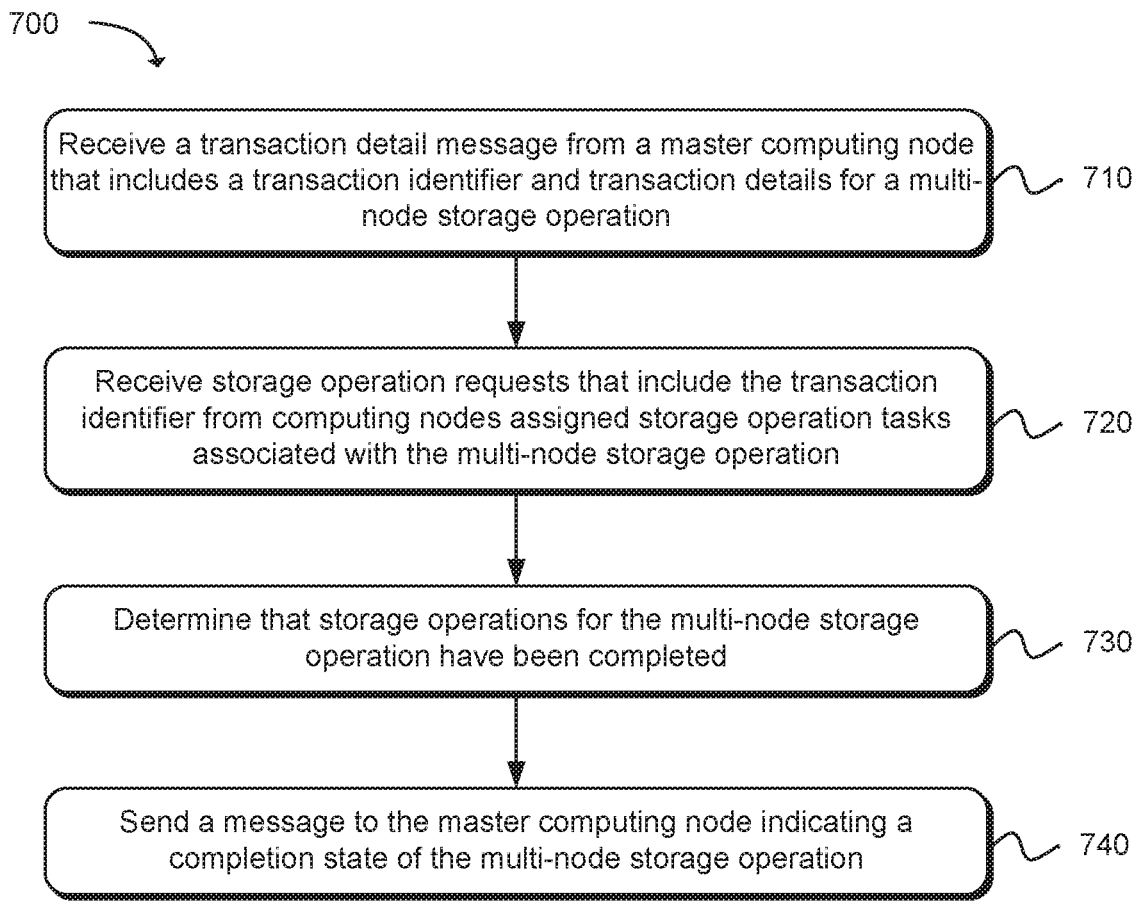
FIG. 7 is a flow diagram illustrating an example method for performing a multi-node storage operation in accordance with an example embodiment.

FIG. 7 is a flow diagram illustrating an example method 700 for performing a multi-node storage operation. The multi-node storage operation may be performed within a system that includes a plurality of computing nodes coupled to each other via network interface controllers and a networked memory storage group coupled to the plurality of computing nodes through a network fabric.

The networked memory storage group can be configured to, as in block 710, receive a transaction detail message from a master computing node that includes a transaction identifier and transaction details for a multi-node storage operation. Thereafter, as in block 720, the networked memory storage group may receive storage operation requests that include the transaction identifier from computing nodes assigned storage operation tasks associated with the multi-node storage operation.

As in block 730, the networked memory storage group may be configured to determine that storage operations for the multi-node storage operation have been completed. In determining that the storage operations for the multi-node storage operation have been completed, as in block 740, the networked memory storage group may be configured to send a message to the master computing node indicating a completion state of the multi-node storage operation.

Figure 8:
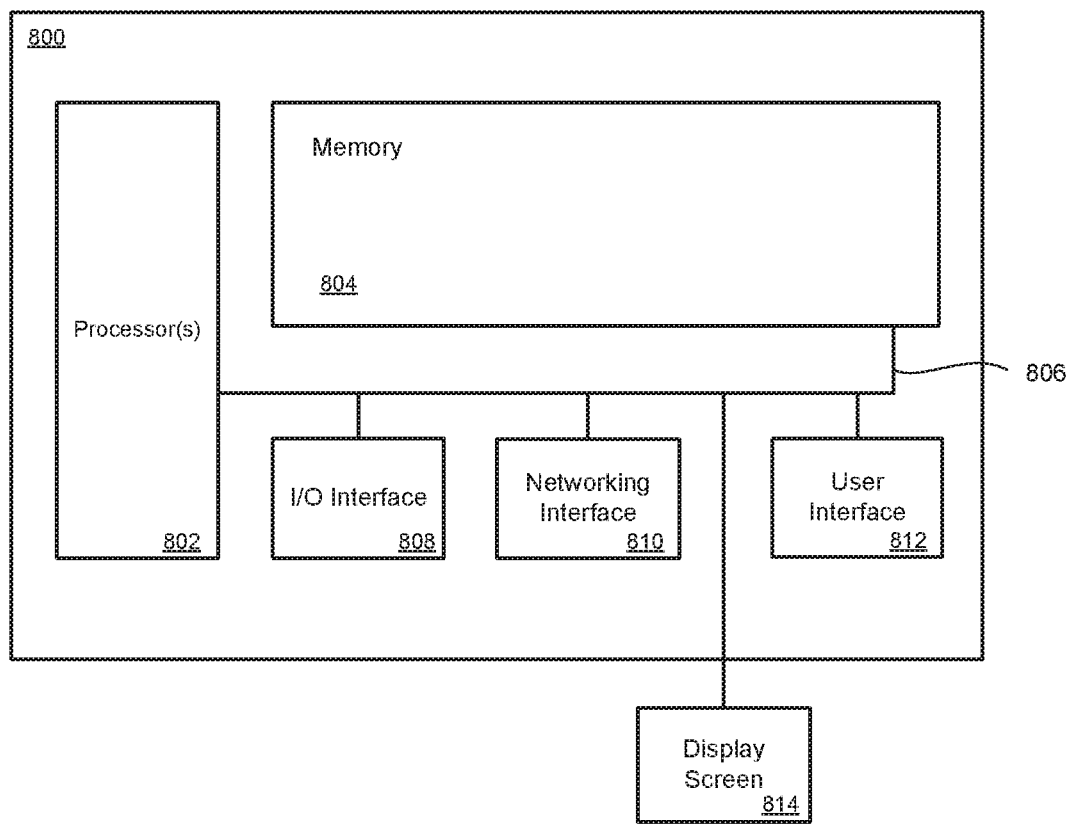
FIG. 8 illustrates a computing system that includes a memory device in accordance with an example embodiment.

FIG. 8 illustrates a general computing system or device 800 that can be employed in the present technology. The computing system or device 800 can include a processor 802 in communication with a memory 804. The memory 804 can include any device, combination of devices, circuitry, and the like that is capable of storing, accessing, organizing, and/or retrieving data.

The computing system or device 800 additionally includes a local communication interface 806 for connectivity between the various components of the system. The local communication interface 806 can vary widely depending on the processor, chipset, memory architectures of the system, and the like. For example, the communication interface 806 can be a data bus, a command/address bus, a package interface, or the like.

The computing system or device 800 can also include an I/O interface 808 for controlling the I/O functions of the system, as well as for I/O connectivity to devices outside of the computing system 800. A network interface 810 can also be included for network connectivity. The network interface 810 can control network communications both within the system and outside of the system. The network interface can include a wired interface, a wireless interface, a Bluetooth interface, optical interface, communication fabric, fabric switches, and the like, including appropriate combinations thereof. Furthermore, the computing system 800 can additionally include a user interface 812, a display device 814, as well as various other components that would be beneficial for such a system.

The processor 802 can be a single or multiple processors, including single or multiple processor cores, and the memory 804 can be a single or multiple memories. The local communication interface 806 can be used as a pathway to facilitate communication between any of a single processor, multiple processors, a single memory, multiple memories, the various interfaces, and the like, in any useful combination. In some examples, the communication interface 806 can be a separate interface between the processor 802 and one or more other components of the system, such as, for example, the memory 804. The memory 804 can include system memory that is volatile, nonvolatile, or a combination thereof, as described herein. The memory 804 can additionally include nonvolatile memory utilized as a memory store.

Volatile memory, for example, is a storage medium that requires power to maintain the state of data stored by the medium. Nonlimiting examples of volatile memory can include random access memory (RAM), such as static random access memory (SRAM), dynamic random-access memory (DRAM), synchronous DRAM (SDRAM), and the like, including combinations thereof. SDRAM memory can include any variant thereof, such as single data rate SDRAM (SDR DRAM) and double data rate (DDR) SDRAM, including DDR, DDR2, DDR3, DDR4, DDR5, and so on, described collectively as DDRx. In some examples, DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org; DDR5 SDRAM is forthcoming). Such standards (and similar standards) may be referred to as DDR-based standards, and communication interfaces that implement such standards may be referred to as DDR-based interfaces. In one specific example, the system memory can be DRAM. In another specific example, the system memory can be DDRx SDRAM.

Nonvolatile memory (NVM) is a persistent storage medium, or in other words, a storage medium that does not require power to maintain the state of data stored therein. Nonlimiting examples of NVM can include any combination of planar or three-dimensional (3D) NAND flash memory, NOR flash memory, cross point array memory, including 3D cross point memory, phase change memory (PCM), such as chalcogenide PCM, non-volatile dual in-line memory module (NVDIMM), ferroelectric memory (FeRAM), silicon-oxide-nitride-oxide-silicon (SONOS) memory, polymer memory (e.g., ferroelectric polymer memory), ferroelectric transistor random access memory (Fe-TRAM), spin transfer torque (STT) memory, nanowire memory, electrically erasable programmable read-only memory (EEPROM), magnetoresistive random-access memory (MRAM), write in place non-volatile MRAM (NVMRAM), nanotube RAM (NRAM), and the like, including combinations thereof. NVM may be byte and/or block addressable. In some examples, NVM can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In one specific example, the system memory can be 3D cross point memory. In another specific example, the system memory can be STT memory.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific embodiments and point out specific features, elements, or steps that can be used or otherwise combined in achieving such embodiments.

In one example, there is provided a networked memory storage group, comprising processor, a plurality of networked memory storage devices, a first network interface controller configured to receive a transaction detail message from a master computing node that includes a transaction identifier and transaction details for a multi-node storage operation, receive storage operation requests that include the transaction identifier from a plurality of computing nodes assigned storage operation tasks associated with the multi-node storage operation, associate the storage operation requests with the transaction details included in the transaction detail message, and send a completion state for the multi-node storage operation to the master computing node, and a second network interface controller configured to send storage operation instructions to the networked storage devices.

In one example of the networked memory storage group, the first network interface controller is further configured to determine that storage operations for the multi-node storage operation have been completed, wherein the completion state indicates that the multi-node storage operation is complete.

In one example of the networked memory storage group, the first network interface controller is further configured to determine that at least one storage operation for the multi-node storage operation has failed, wherein the completion state indicates that the multi-node storage operation failed.

In one example of the networked memory storage group, the networked memory storage group is configured to provide byte-addressable memory.

In one example of the networked memory storage group, the networked memory storage group is configured to provide block-addressable storage.

In one example of the networked memory storage group, the first network interface controller is coupled to a network fabric of a multi-node system.

In one example of the networked memory storage group, the second network interface controller is coupled to the plurality of networked memory storage devices.

In one example of the networked memory storage group, the master computing node is configured to manage the multi-node storage operation.

In one example of the networked memory storage group, the transaction details in the transaction detail message include storage operations that comprise the multi-node storage operation In one example of the networked memory storage group, the first network interface controller is further configured to match the transaction details to the storage operation requests that include the transaction identifier received from the plurality of computing nodes.

In one example of the networked memory storage group, the first network interface controller is further configured to identify that a plurality of storage operations that correspond to the transaction details have been performed, indicating that the multi-node storage operation is complete.

In one example of the networked memory storage group, the transaction details in the transaction detail message contain identifiers for the plurality of computing nodes assigned the storage operation tasks associated with the multi-node storage operation.

In one example of the networked memory storage group, the message indicating completion of the multi-node storage operation includes the transaction identifier.

In one example of the networked memory storage group, the master computing node is configured to send messages that include the transaction identifier to the plurality of computing nodes instructing the plurality of computing nodes to perform a storage operation task.

In one example, there is provided a multi-node system comprising a plurality of computing nodes, each comprising one or more processors, a network fabric coupled to each computing node via network interface controllers, and a networked memory storage group that is coupled to the plurality of computing nodes through the network fabric, the networked memory storage group being configured to receive a transaction detail message from a master computing node that includes a transaction identifier and transaction details for a multi-node storage operation, receive storage operation requests that include the transaction identifier from computing nodes assigned storage operation tasks associated with the multi-node storage operation, determine that storage operations for the multi-node storage operation have been completed, and send a message to the master computing node indicating a completion state of the multi-node storage operation.

In one example of the multi-node system, the master computing node is configured to coordinate the multi-node storage operation by at least sending the transaction detail message to the networked memory storage group, and sending storage transaction messages that include the transaction identifier to the computing nodes assigned the storage operation tasks associated with the multi-node storage operation.

In one example of the multi-node system, at least one computing node included in the plurality of computing nodes receives a storage transaction message sent by the master computing node that includes the transaction identifier and assigns a storage operation task associated with the multi-node storage operation to the at least one computing node.

In one example of the multi-node system, the networked memory storage group is further configured to buffer the storage operation requests that include the transaction identifier in a request buffer.

In one example of the multi-node system, the networked memory storage group is further configured to determine an order in which to perform the storage operation requests buffered in the request buffer.

In one example of the multi-node system, the networked memory storage group is further configured to combine two or more of the storage operation requests buffered in the request buffer.

In one example, there is provided a method of performing a multi-node storage operation, comprising generating, at a master node included in a multi-node environment, a transaction detail message that includes a transaction identifier and transaction details for the multi-node storage operation, sending the transaction detail message to a networked memory storage group configured to identify storage operation requests that include the transaction identifier, wherein the storage operation requests are received from computing nodes included in the multi-node environment, sending storage transaction messages to a plurality of computing nodes, wherein the storage transaction messages include the transaction identifier and instructions to perform storage operation tasks associated with the multi-node storage operation, and receiving a message from the networked memory storage group indicating completion of the multi-node storage operation.

In one example of the method, the method further comprises dividing the multi-node storage operation into the storage operation tasks and assigning the storage operation tasks to the plurality of computing nodes.

In one example of the method, the method further comprises receiving periodic updates from the networked memory storage group indicating a progress of the multi-node storage transaction.

In one example of the method, the master node is communicatively coupled to the networked memory storage group and to the plurality of computing nodes through a network fabric.

In one example of the method, the method further comprises sending the transaction detail message to a second networked memory storage group included in high-availability system.

In one example of the method, the plurality of computing nodes are responsible for updating parts of a global state for a shared object.

What is claimed is:

1. An apparatus, comprising:
a processor;
a group of networked memory storage devices;
a first network interface controller configured to:
  receive a transaction detail message from a master computing node that includes a transaction identifier and transaction details for a multi-node storage operation;
  receive storage operation requests that include the transaction identifier from a plurality of computing nodes assigned storage operation tasks associated with the multi-node storage operation;
  associate the storage operation requests with the transaction details included in the transaction detail message; and
  send a completion state message for the multi-node storage operation to the master computing node; and
a second network interface controller configured to send the storage operation tasks to the group networked memory storage devices.

2. The apparatus of claim 1, wherein the first network interface controller is further configured to determine that storage operations for the multi-node storage operation have been completed, wherein the completion state message indicates that the multi-node storage operation is complete.

3. The apparatus of claim 1, wherein the first network interface controller is further configured to determine that at least one storage operation for the multi-node storage operation has failed, wherein the completion state message indicates that the multi-node storage operation failed.

4. The apparatus of claim 1, wherein the group of networked memory storage devices is configured to provide byte-addressable memory.

5. The apparatus of claim 1, wherein the group of networked memory storage devices is configured to provide block-addressable storage.

6. The apparatus of claim 1, wherein the first network interface controller is coupled to a network fabric of a multi-node system.

7. The apparatus of claim 1, wherein the second network interface controller is coupled to the plurality of networked memory storage devices.

8. The apparatus of claim 1, wherein the master computing node is configured to manage the multi-node storage operation.

9. The apparatus of claim 1, wherein the transaction details in the transaction detail message specify storage operations that comprise the multi-node storage operation.

10. The apparatus of claim 1, wherein the first network interface controller is further configured to match the transaction details to the storage operation requests that include the transaction identifier received from the plurality of computing nodes.

11. The apparatus of claim 1, wherein the first network interface controller is further configured to identify that a plurality of storage operations that correspond to the transaction details have been performed, indicating that the multi-node storage operation is complete.

12. The apparatus of claim 1, wherein the transaction details in the transaction detail message contain identifiers for the plurality of computing nodes assigned the storage operation tasks associated with the multi-node storage operation.

13. The apparatus of claim 1, wherein the completion state message includes the transaction identifier.

14. The apparatus of claim 1, wherein the master computing node is configured to send messages that include the transaction identifier to the plurality of computing nodes instructing the plurality of computing nodes to perform a storage operation task.

* * * * *